Sept. 19, 1967  E. M. TELLERMAN  3,343,158
ELECTRONIC CONTROL FOR FAULT DETECTION AND STOP-MOTION SYSTEM
Filed March 4, 1964  2 Sheets-Sheet 2

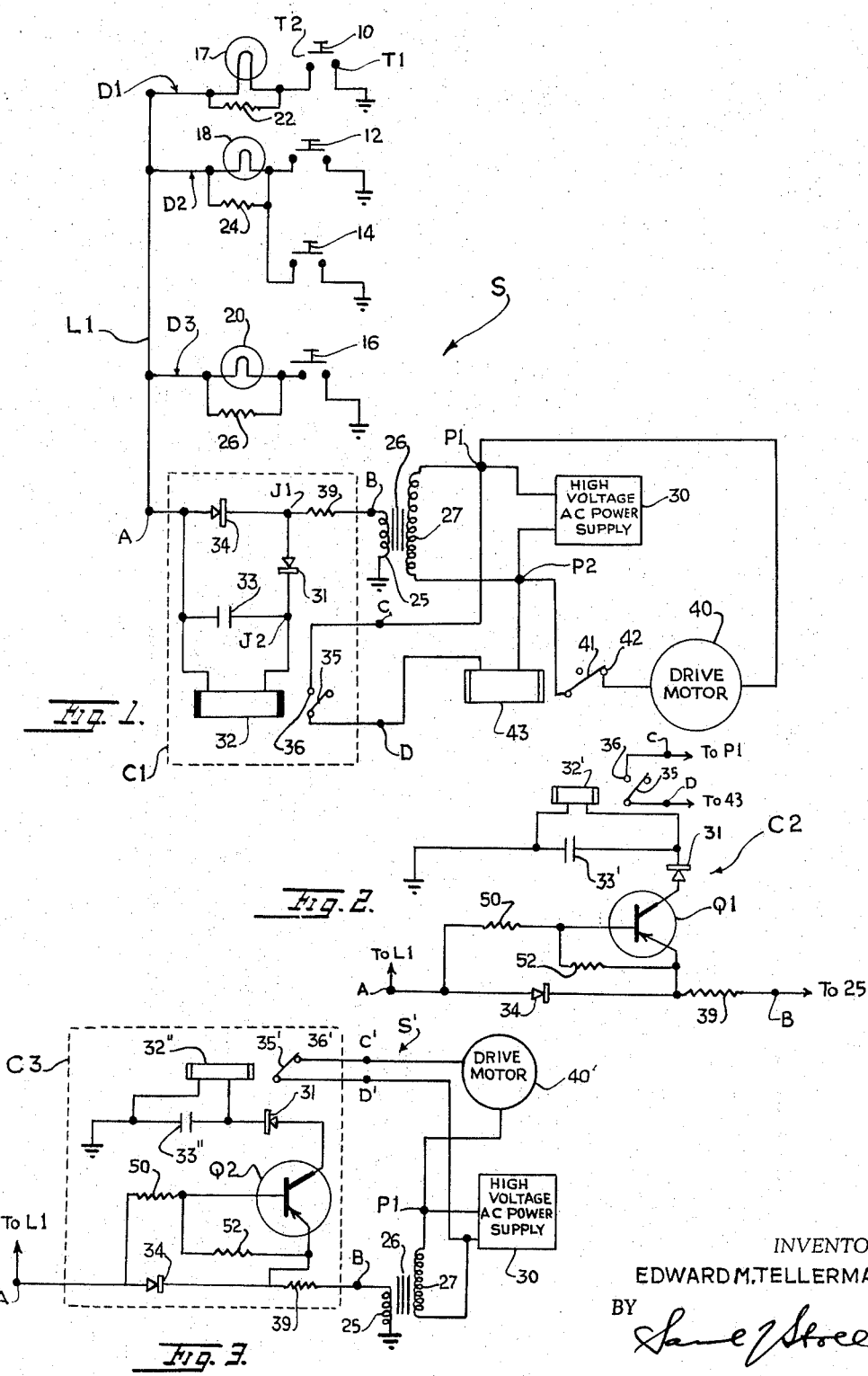

*INVENTOR.*
Edward Tellerman

ATTORNEY.

United States Patent Office 3,343,158
Patented Sept. 19, 1967

3,343,158
ELECTRONIC CONTROL FOR FAULT DETECTION AND STOP-MOTION SYSTEM
Edward M. Tellerman, Valley Stream, N.Y., assignor to Stop-Motion Devices Corporation, Plainview, N.Y.
Filed Mar. 4, 1964, Ser. No. 349,418
11 Claims. (Cl. 340—419)

This invention relates to fault detection and stop-motion systems for knitting machines and more particularly involves an electronic control circuit for stopping a knitting machine when a fault in knitting occurs.

The invention provides electronic means for supplying power to light fault detector lamps automatically when fault detectors such as switches located at fault detection positions in a knitting machine are closed. The invention further provides electronic means for automatically actuating a stop-motion or motor cut-off circuit when a knitting fault occurs, to stop a motor driving a knitting machine.

According to the invention, faster cut-off of the drive motor is effected than in prior known stop-motion systems, due to the novel electronic control circuit provided herein. Use of manually operated switches heretofore employed to light lamps in fault detection circuits, is avoided. High resistance resistors are used in circuit with the detector lamps. These resistors do not overheat even though the detector lamps are lighted continuously or for extended periods of time. The invention makes it possible to provide fault detector lamps at the fault detection positions along with fault detector switches and/or to locate fault detector lamps remotely at an operator's position for instant indication of the nature and location of the fault detected. The invention also provides quicker, more powerful, motor cut-off or stop-motion action to insure more dependable and safer operation of a knitting machine. The electronic circuit embodying the invention makes it possible to provide power to the stop-motion circuit and the fault detector lamp circuits in a single-wire system, as contrasted with prior known stop-motion circuits which require a two-wire system, with one wire circuit for the detector lamps and other wire circuit for the stop-motion control means. The control circuit embodying the invention is more economical to manufacture, simpler to install, more reliable and automatic in operation, safer and more efficient, than prior known control circuits used in fault detection and stop-motion control systems for knitting machines.

It is therefore one object of the invention to provide a novel electronic control circuit for a fault detection and a stop-motion control system in a knitting machine.

Another object is to provide a novel electronic circuit for controlling division and distribution of power to fault detectors and to drive motor cut-off means of a knitting machine.

A further object is to provide an improved fault detection and stop-motion system for a knitting machine.

The invention will be best understood from the following detailed description taken together with the drawing, wherein:

FIGURE 1 and FIGURE 3 are schematic diagrams of systems embodying the invention.

FIGURE 2 is a schematic diagram of an electronic control circuit which may be substituted in the system of FIGURE 1, according to the invention.

Figure 7:
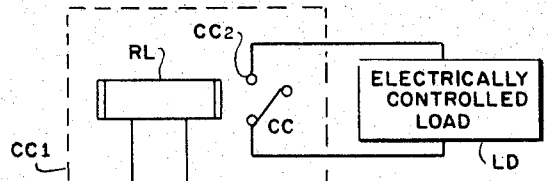
FIGURES 7, 8 and 9 are diagrams of load circuits which may be used in systems embodying the invention.

Referring first to FIGURE 1, there is shown system S including a plurality of spring lever operated switches 10, 12, 14 and 16. These switches may serve respectively as top yarn detector, yarn carrier detector, needle protector and bottom yarn detector, all conventionally incorporated in knitting machines of known types. Located on or near each of the detector switches and connected in series therewith are lamps 17, 18 and 20. Lamps 17 and 20 are each in series circuit with a single detector switch 10 or 16. Lamp 18 is connected in series with both of switches 12 and 14. One contact terminal T1 of each switch is grounded. The other contact terminal T2 is connected to one of the lamps. Connected across the lamps are individual resistors 22, 24 and 26 each having a high resistance to permit the system to function even though a lamp may burn out. These resistors will not heat up unduly even though the associated detector switches are closed for extended periods of time. This is one of the advantageous features of the system as will be explained.

The system includes an electronic control circuit C1 which is one of the characteristic features of the invention. This circuit has terminals A, B, C and D. Terminal A is connected to wire or line L1 which is connected in common to all switch contact terminals T2. Terminal B is connected to one end of secondary winding 25 of a stepdown transformer 26. The other end of the winding 25 is grounded. The primary winding 27 is connected to terminals P1, P2 of a high voltage alternating current power supply 30.

Circuit C1 includes a sensitive alternating current relay 32. A capacitor 33 is connected across the coil of this relay. A first diode rectifier 34 is connected between terminals A and B. A second diode 31 is connected between junction points J1 and J2. Junction point J1 is connected to terminal B and junction point J2 is connected to one end of the capacitor 33 and one end of the relay coil. The relay has normally open contacts 35, 36 which close when the relay is energized. Contact 36 is connected to circuit terminal C. A current limiting resistor 39 is provided between point J1 and terminal B to prevent burnout of the transformer or other components in the event of overload. Contact 35 is connected to circuit terminal D.

A motor 40 is conventionally provided to operate the knitting machine for which the present system is provided. This motor is energized by power supply 30 via normally closed contacts 41, 42 of a relay 43. The relay 43 is normally deenergized. The coil of relay 43 is connected in series with normally open relay contacts 35, 36 in electronic control circuit C1. One end of the coil of relay 43 is connected to terminal D of circuit C1. The other end of the relay coil is connected to power supply terminal P2.

In general, the components shown in FIGURE 1 outside of circuit C1 may be found in conventional knitting machine installations. The present invention makes it possible to remove whatever electric control means may be installed and connected at terminals A, B, C and D, and instead to install electronic control circuit C1. The multiple advantages of the invention will ensue from this replacement of control means.

A particular requirement of the system S is that the actuation or closing of any detector switch should result in lighting an associated lamp and must always result in energizing relay 32. When relay 32 is energized, contacts 35, 36 close and relay 43 becomes energized so that contacts 41, 42 open and the motor 40 becomes deenergized and stops. The response of circuit C1 and the consequent stopping of motor 40 must be instantaneous and immediate. In addition the power supply circuit of the motor must remain open continuously as long as any detector switch remains closed.

In the present invention, power is applied to lamps 17, 18 and 20 via a circuit path which is independent of the circuit path through which relay 32 is energized. The circuit C1 remains operative in spite of wide voltage or resistance changes which may occur in the components of the system external to circuit C1.

It will be noted that circuit C1 employs two diode rectifiers 31, 34. When electric current is traveling from terminal A to terminal B via diode 34, the coil of relay 32 is substantially short circuited, so that substantially the entire power output of transformer 26 is applied to that one of detector circuits D1–D3 which may be closed. Since all the detector circuits are connected in parallel, between line L1 and ground, if two or more detector circuits are closed simultaneously they will share the power drawn from transformer 26.

Transformer 26 applies alternating current to circuit C1. When the current reverses direction during half of each cycle, the relay 32 is in series with the parallel-connected detector circuits D1–D3. The more detector circuits that are closed, the greater will be the share of voltage applied to relay 32. The circuit C1 will be designed so that relay 32 will be energized if any one or more detector circuits are closed, and so that the relay is not overloaded if two or more detector circuits are closed simultaneously.

The relay 32 is arranged to remain energized during the alternate half cycles when polarity of applied voltage is reversed, by means of the storage capacitor 33 which charges during the half cycles when the relay draws current from the transformer, and which discharges through the coil of relay 32 during the alternate half cycles.

Since the detector circuits D1–D3 employ indicating lamps, it will be of no consequence that little or no current is drawn by the lamps of closed detector circuits during alternate half cycles while relay 32 is drawing current from the transformer, since the lamps will still appear to be lighted brightly. This will be true especially if the lamps are designed to be lighted brightly when as little as one half the voltage supplied by secondary winding 25 is applied. Relay 32 is operative to effect stopping of the motor, but requires very little power to do this. The system is arranged so that the heavy duty relay contacts 41, 42 which are connected in the power supply circuit of the motor are isolated from relay 32 which only serves to actuate relay 43. The relay 43 thus acts in effect as an amplifier device under control of the low power sensitive relay 32.

It will thus be apparent that in circuit C1 current passes directly from the transformer secondary through any closed detector circuit and diode rectifier 34 during one half of each alternating cycle. During the other half of the alternating cycle, the current passes to the closed detector circuit via the relay 32 and also charges storage capacitor 33. The relay 32 is designed so it will be sufficiently energized to close contacts 35, 36 when any one or more of the detector circuits D1–D3 are closed and will not be overloaded when all the detector circuits are closed.

In FIGURE 2 is shown circuit C2 which may be substituted in place of circuit C1 in system S of FIGURE 1. The terminals A–D of circuit C2 will be connected to the same points as in circuit C1. Certain parts of circuit C1 are also used in circuit C2 and these corresponding parts are identically numbered. Thus diode rectifier 34 is connected between circuit terminals A and B and short circuits alternating current relay 32' during alternate half cycles of the applied alternating current.

Storage capacitor 33' is connected across the coil of relay 32' and is charged when the relay is energized while dividing voltage with any one or more closed detector circuits. A transistor Q1 is provided to serve as an amplifier so that the relay 32' need not be as sensitive as relay 32 of circuit C1. Resistor 50 connected between terminal A and the transistor base safely limits the base current. Resistor 52 connected between base and emitter of the transistor is a bias resistor.

In circuit C2, the relay 32' does not require the closed detector circuit or circuits D1–D3 to pass as much of the current drawn by the relay coil as in circuit C1 because of the provision of transistor amplifier Q1. This is advantageous, because it makes it possible to place a high resistance across each lamp to pass current in the event a lamp burns out. This resistor 22, 24 or 26 may have a high value of several thousand ohms so that it will not overheat in the event of a lamp burnout when a detector circuit is closed.

In system S' of FIGURE 3, the terminals A and B may be connected respectively like the same lettered terminals of circuits C1 and C2 to the detector circuits D1–D3 via line L1 and to secondary winding 25 of transformer 26. Relay 32" has normally closed contacts 35', 36' connected in series with motor 40' and power supply 30 via terminals C', D', so that relay 32" directly controls the motor, as contrasted with the system S in which relay 32 controls the motor via a power relay 43. In the arrangement of system S', relay 32" serves as a power relay. The transistor amplifier Q2 through which relay 32" is energized should be a power amplifier. Storage capacitor 33" is connected across the coil of relay 32" to discharge through the relay on alternate half cycles when a closed detector circuit is connected directly to the power supply transformer 26 while the transistor Q2 and relay 32" are short circuited. Then when during subsequent alternate half cycles, the transistor and relay divide the applied voltage with the closed detector circuit, with only a small part of the relay current passing through the closed detector circuit. When relay 32" is energized the power supply circuit of the motor 40' is opened.

It will thus be apparent that in all the electronic control circuits C1, C2 and C3, the current passes between points A and B and any closed detector circuits during one half of each current cycle. During the other half cycles, the relay 32, 32' or 32" passes all or part of the current also passed by the closed detector circuits and the storage capacitor charges. During the half cycles when the relay is effectively short circuited by diode rectifier 34, the charged capacitor discharges to keep relay 32, 32' or 32" energized. Diode rectifier 31 prevents short circuiting of the relay 32, 32' or 32" while the storage capacitor is discharging through the relay.

Figure 4:
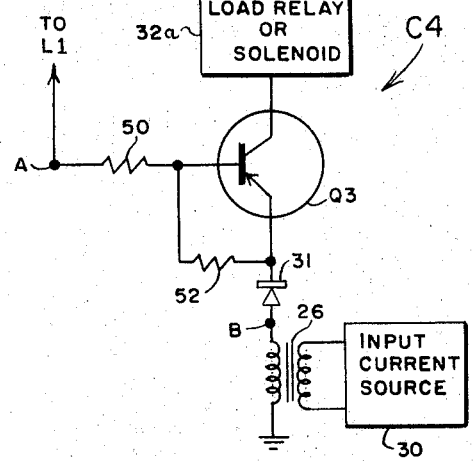

In FIGURE 4 is shown another circuit C4 which can be used in systems S or S'. Parts corresponding to those of circuits C1, C2 or C3 described above are identically numbered. Circuit C4 employs a power transistor Q3 as an amplifier and also as a device capable of passing large enough currents through its trigger leg to light an indicator lamp in series with a detector switch on line L1. Since the transistor Q3 is a current amplifier the detector switch on line L1 needs only a fraction of the current needed to pass through the load relay or solenoid circuit 32a. By using a power transistor the varying number of detectors and lights in operation at any given time and their power requirements will not affect the power applied to the load circuit 32a within the amplification ranges of the transistor.

Figure 5:
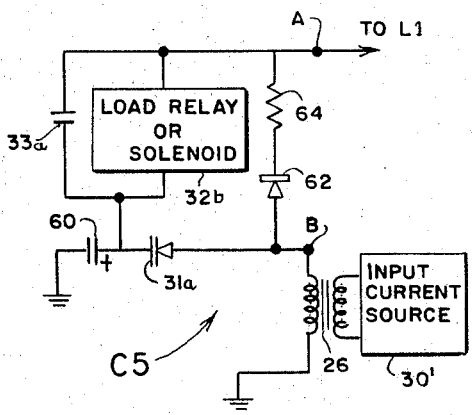
FIGURES 4, 5 and 6 are diagrams of other circuits according to the invention.

FIGURE 5 shows another circuit C5 which can be used in a system embodying the invention. Circuit C5 employs an input current source 30' which is unidirectional and pulsating such as obtained by half-wave rectification of alternating current. Parts of circuit C5 corresponding to those of circuits C1–C4 are identically numbered.

During the times when the current source 30' is passing current through rectifier 31a, capacitor 60 charges. During other times when source 30' is not passing current, if a detector circuit on line L1 goes on or closes, current will flow from charged capacitor 60 through the load relay or solenoid circuit 32b and capacitor 33a, through line L1 and associated detector circuit to ground and back through ground to capacitor 60. This will activate the load control relay or solenoid circuit 32b. Thereafter when the supply current from source 30' passes current through transformer 26, current flows through rectifier 62 and resistor 64 to light the detector lamps. Proper operation of the circuit is thus achieved by providing an interrupted or on-off unidirectional power supply source.

Figure 6:
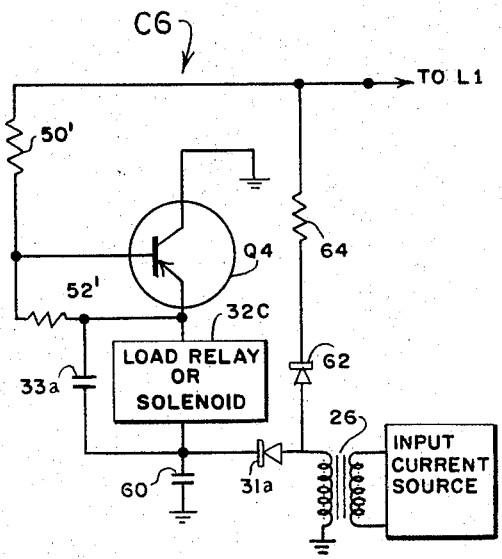

FIGURE 6 shows another circuit C6 which is identical to circuit C5 except that a transistor Q4 is provided in the circuit between the detector circuits on line L1 and the parallel connected capacitor 33a and load relay or solenoid circuit 32c. Transistor Q4 has a bias resistor 52' connected between the base and emitter of the transistor. A resistor 50' for limiting current in the transistor is connected between line L1 and the base of the transistor.

The basic principle of operation of both of circuits C5 and C6 is that when the power supply source 30' is not supplying current capacitor 60 takes over as the power supply source to operate the load control relay or solenoid circuit 32b or 32c if a stop-motion detector circuit is on or closed. When the power supply 30' is conducting almost all current from transformer 26 by-passes the circuit 32b or 32c through diode rectifier 31a and lights the lamp or lamps of a detector circuit or circuits which may be on. It will be understood that the circuits C5 or C6 would not be operative if used with a power supply source 30' which was always conducting. With such a continuously conducting power supply source, the circuit 32b or 32c would never be activated and the indicator lamps of the detector circuits would always be on and capacitor 60 would always be fully charged. If the power supply 30' should be cut-off and stay off, then the lamps of the detector circuits could never be on and the relay circuit 32b or 32c would be activated only instantaneously if there should be an undischarged residual charge on capacitor 60.

Figure 8:
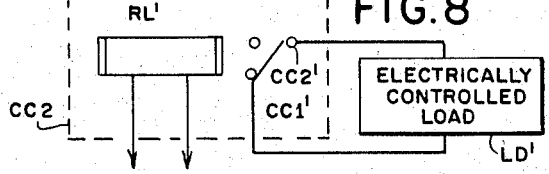
Figure 9:
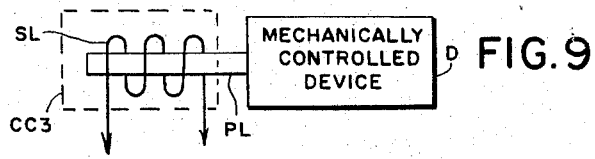

In FIGURES 7, 8 and 9 are shown load control circuits CC1, CC2 and CC3 respectively. In circuit CC1 of FIGURE 7 there is employed a relay RL having normally open contacts CC1, CC2 connected to an electrically controlled load LD. In FIGURE 8 of the circuit CC2 employs relay RL' having normally closed contacts CC1', CC2' connected to an electrically controlled load LD'. In FIGURE 9 the control circuit CC3 is a solenoid SL having a plunger PL mechanically connected to and operating a mechanically controlled stop-motion device D.

The circuit C1 of FIGURE 1 employs a load control circuit in which relay 32 has normally open contacts 35, 36. This circuit corresponds to that of circuit CC1 of FIGURE 7. In FIGURE 2, circuit C2 has relay 32' with normally open contacts 35, 36 also corresponding to circuit CC1. In FIGURE 3 circuit C3 has relay 32" provided with normally closed contacts 35', 36' corresponding to load circuit CC2 of FIGURE 8.

In FIGURES 4–6 the load circuits are indicated generally as circuits 32a, 32b and 32c respectively. It should be understood that in all the circuits and systems illustrated in FIGURES 1–6, any one of the relay load control circuits of FIGURES 7, 8 or the solenoid circuit of FIGURE 9 may be used interchangeably depending on the type and design of load to be controlled.

In all forms of the invention, the basic purpose of providing an instantaneously responsive stop-motion or motor cut-off is accomplished by an electronic control circuit. This control circuit remains active and operative to keep the motor cut off while any detector circuit is closed. The present invention makes it possible to install an efficient automatic electronic control means in a knitting machine employing conventional fault detectors and motor cut-off controls. The burnout, removal or open circuiting of a fault indicating lamp will not render any detector circuit inoperative because the high resistance provided will pass the necessary current. This high resistance will not overheat, and will draw very low current.

The electronic control circuits C1–C6 may be made up very inexpensively. They may use small printed circuit base boards upon which small components such as resistors, transistors, capacitors and diodes are mounted. The detector circuits may be one-wire or two-wire circuits.

While a limited number of embodiments of the invention have been described, it will be understood that modifications may be made without departing from the scope of the appended claims.

What is claimed is:
1. A control circuit for a fault detection and motor cut-off system of the character described, comprising in combination:
   (a) a first circuit path having two terminals for passing current through said path;
   (b) first rectifier means in said path so that current flows therein in only one direction and only during alternate half cycles of alternating voltage applied to said terminals;
   (c) a second circuit path connected at its ends to said two terminals respectively for application of said alternating voltage to the second circuit path;
   (d) second rectifier means in the second circuit path so that current flows in one direction therein between its ends only during the other alternate half cycles of said alternating voltage when no current flows in said first circuit path;
   (e) a motor cut-off device in said second circuit path energized during said other alternate half cycles by the current flowing in said second circuit path; and
   (f) electric storage means connected across said device in said second circuit path for storing electric energy during said other alternate half cycles and for discharging the stored electric energy through said device during the first named alternate half cycles so that said device is continuously energized while current flows in either of the first and second circuit paths.

2. A control circuit according to claim 1, wherein said motor cut-off device is a relay having contacts actuated when the relay is energized to control application and cut-off of power applied to said motor.

3. A control circuit according to claim 1, wherein said device includes a transistor in circuit with a relay so that the transistor passes part of the current flowing in said second circuit path while the relay passes another part of the current flowing in the second circuit path, said relay having contacts actuated when the relay is energized and deenergized to control application and cut-off of power applied to said motor.

4. In a fault detection and motor cut-off system of the character described, the combination comprising:
   (a) at least one fault detector circuit including switch means and a relatively high resistance connected in series;
   (b) a source of alternating voltage;
   (c) a control circuit including a first circuit path having two terminals for passing current through said path, one of said terminals being connected to the detector circuit, the other of said terminals being connected to said source of alternating voltage;
   (d) first rectifier means in said path so that current flows therein and through said detector circuit in one direction, only during alternate half cycles of said alternating voltage and only while said switch means is closed;
   (e) a second circuit path connected at its ends to said two terminals respectively for application of said alternating voltage to the second circuit path;
   (f) second rectifier means in the second circuit path so that current flows therein in one direction between its ends and through said detector circuit only during the other alternate half cycles of said alternating voltage and while no current flows in said first circuit path;
   (g) a motor cut-off device in said second circuit path energized during said other alternate half cycles by the current flowing in said second circuit path; and (h) electric storage means connected across said device in said second circuit path for storing electric energy during said other alternate half cycles and for discharging the stored electric energy through said device during the first named alternate half cycles so that said device is continuously energized while current flows in either of the first and second circuit paths.

5. The combination of claim 4, wherein said motor cut-off device is a relay having contacts actuated when the relay is energized to control application and cut-off of power applied to said motor.

6. The combination of claim 4 wherein said device includes a transistor in circuit with a relay so that the transistor passes part of the current flowing in said second circuit path while the relay passes another part of the current flowing in the second circuit path, said relay having contacts actuated when the relay is energized and deenergized to control application and cut-off of power applied to said motor.

7. The combination of claim 4, further comprising a lamp connected in parallel with said high resistance to indicate by lighting when said switch means is closed, said high resistance limiting the current passing through said detector circuit to prevent overheating of the detector circuit when the detector circuit is conducting current.

8. In a fault detection and motor cut-off system of the character described, the combination comprising:
  (a) a plurality of fault detector circuits connected together in parallel with each other, each of said circuits including a switch means and a resistor having a relatively high resistance connected in series;
  (b) a source of alternating voltage;
  (c) a control circuit including a first circuit path having two terminals for passing current through said path, one of said terminals being connected to the detector circuits, the other of said terminals being connected to said source of alternating voltage;
  (d) first rectifier means in said path so that current flows therein and through at least one of said detector circuits in one direction only during alternate half cycles of said alternating voltage and only while said switch means in said one detector circuit is closed;
  (e) a second circuit path connected at its ends to said two terminals respectively for application of said alternating voltage to the second circuit path;
  (f) second rectifier means in the second circuit path so that current flows therein in one direction between its ends and through said one detector circuit only during the other alternate half cycles of said alternating voltage and while no current flows in said first circuit path;
  (g) a motor cut-off device in said second circuit path energized during said other alternate half cycles by the current flowing in said second circuit path;
  (h) electric storage means connected across said device in said second circuit path for storing electric energy during said other alternate half cycles and for discharging the stored electric energy through said device during the first named alternate half cycles so that said device is continuously energized while current flows in either of the first and second circuit paths;
  (i) and a lamp connected in parallel with the high resistance in certain of the detector circuits to indicate by lighting when said switch means in said certain detector circuits is closed.

9. The combination of claim 8, wherein said motor cut-off device is a relay having contacts actuated when the relay is energized to control application and cut-off of power applied to said motor.

10. The combination of claim 8, wherein said device includes a transistor in circuit with a relay so that the transistor passes part of the current flowing in said second circuit path while the relay passes another part of the current flowing in the second circuit path, said relay having contacts actuated when the relay is energized and deenergized to control application and cut-off of power applied to said motor.

11. A control circuit for a fault detection and motor cut-off system of the character described, comprising in combination:
  (a) a source of pulsating cyclically interrupted unidirectional current;
  (b) at least one fault detector circuit;
  (c) first rectifier means in series circuit with said detector circuit and current source to define a first circuit path;
  (d) a second rectifier means and a capacitor connected in series with said current source and defining a second circuit path parallel to the first circuit path, said capacitor being charged when said current source is conducting current; and
  (e) a load control circuit connected between said capacitor and said fault detector circuit and being energized by current supplied by the charged capacitor when said fault detector circuit is closed and while said current source is non-conducting, whereby said load control circuit is always actuated both when said current source is on and off while said fault detector circuit is closed.

References Cited

UNITED STATES PATENTS

| 2,503,011 | 4/1950 | Tschumi | 340—176 X |
| 2,673,947 | 3/1954 | Winther | 340—176 X |
| 2,880,381 | 3/1959 | Anthonevich | 340—222 X |
| 2,976,463 | 3/1961 | Adams | 317—157 X |
| 3,048,748 | 8/1962 | Carey | 317—157 |

NEIL C. READ, *Primary Examiner.*

R. ANGUS, D. L. TRAFTON, *Assistant Examiners.*